(12) United States Patent
Koehler et al.

(10) Patent No.: US 10,580,138 B2
(45) Date of Patent: Mar. 3, 2020

(54) EDGE DETECTION ON IMAGES WITH CORRELATED NOISE

(71) Applicant: KONINKLIJKE PHILIPS N.V., Eindhoven (NL)

(72) Inventors: Thomas Koehler, Norderstedt (DE); Roland Proksa, Neu Wulmstorf (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 31 days.

(21) Appl. No.: 15/574,173

(22) PCT Filed: Jun. 15, 2016

(86) PCT No.: PCT/EP2016/063670
§ 371 (c)(1),
(2) Date: Nov. 15, 2017

(87) PCT Pub. No.: WO2016/207036
PCT Pub. Date: Dec. 29, 2016

(65) Prior Publication Data
US 2018/0130212 A1    May 10, 2018

(30) Foreign Application Priority Data
Jun. 26, 2015    (EP) .................................... 15174046

(51) Int. Cl.
*G06T 7/13*       (2017.01)
*G06T 7/174*      (2017.01)
*G06T 7/187*      (2017.01)

(52) U.S. Cl.
CPC ................ *G06T 7/13* (2017.01); *G06T 7/174* (2017.01); *G06T 7/187* (2017.01); *G06T 2207/20076* (2013.01); *G06T 2211/408* (2013.01)

(58) Field of Classification Search
CPC ........... G06T 7/13; G06T 7/187; G06T 7/174; G06T 2207/20076; G06T 2211/408
See application file for complete search history.

(56) References Cited

U.S. PATENT DOCUMENTS

2006/0078181 A1    4/2006   Chen
2006/0087703 A1    4/2006   Chen
(Continued)

FOREIGN PATENT DOCUMENTS

WO    2014/097065    6/2014
WO    2014/207139    12/2014

OTHER PUBLICATIONS

Pantelic, et al., "Bilateral edge filter: Photometrically weighted, discontinuity based edge detection", Journal of Structural Biology, vol. 160, No. 1, Oct. 1, 2007.
(Continued)

*Primary Examiner* — Leon Flores
(74) *Attorney, Agent, or Firm* — Larry Liberchuk

(57) ABSTRACT

An image processing system comprising: an input port (IN) for receiving two input images acquired of an object. Respective contrast in said images encodes information on different physical properties of the object. The images being converted from a signal detected at a detector (D) of an imaging apparatus (IM). A differentiator of the image processing system forms respective differences from pairs of image points from the respective input images. An edge evaluator (EV) computes, based on said differences, an edge score for at least one of said pairs of image points. The score is based on a measure that represents or is derivable from a conditional noise likelihood function. The likelihood function is based on a probability density that models noise for said signal. Said score is output through an output port (OUT).

13 Claims, 4 Drawing Sheets

(56) References Cited

U.S. PATENT DOCUMENTS

| | | | |
|---|---|---|---|
| 2006/0221304 A1* | 10/2006 | Damera-Venkata | ............................ H04N 9/3105 353/30 |
| 2012/0177274 A1* | 7/2012 | Koehler | .................... G06T 5/50 382/131 |
| 2013/0064469 A1 | 3/2013 | Koehler | |
| 2013/0127824 A1* | 5/2013 | Cohen | ...................... G06T 7/12 345/419 |
| 2014/0055572 A1* | 2/2014 | Shirai | .................. H04N 5/2258 348/47 |
| 2014/0212015 A1 | 7/2014 | Ding | |
| 2015/0317777 A1* | 11/2015 | Koehler | ................. G06T 5/002 382/261 |

OTHER PUBLICATIONS

Wunderlich, et al., "Image covariance and lesion detectability in direct fan-beam X-ray computed tomography", Physics in Medicine and Biology 53 (2008).

S.O. Rice "Mathematical Analysis of Random Noise", Bell System Technical Journal, 23: Jul. 3, 1944 pp. 282-332 or Bell System Technical Journal, 24: 1945 pp. 46-156.

Van der Heijden, "Edge and Line Feature Extraction Based on Covariance Models", IEEE Transactions on Pattern Analysis and Machine Intelligence, vol. 11, No. I, Jan. 1995.

* cited by examiner

EDGE DETECTION ON IMAGES WITH CORRELATED NOISE

CROSS REFERENCE TO RELATED APPLICATIONS

This application is the U.S. National Phase application under 35 U.S.C. § 371 of International Application No. PCT/EP2016/063670, filed Jun. 15, 2016, published as WO 2016/207036 on Dec. 29, 2016, which claims the benefit of European Patent Application Number 15174046.1 filed Jun. 26, 2015. These applications are hereby incorporated by reference herein.

FIELD OF THE INVENTION

The invention relates to an image processing system, to an image processing method, to an imaging arrangement, to a computer program element, and to a computer readable medium.

BACKGROUND OF THE INVENTION

There are new imaging modalities emerging which provide not just a single image of the patient or the object, but two or more of them in exactly the same geometry.

One example for such a "multi-contrast" imaging modality is spectral computed tomography (CT), where x-ray attenuation due to the photoelectric effect, Compton scattering, and possibly due contrast agents are imaged, thus providing two or three different imaging with different contrasts for different physical effects. Another example is differential phase contrast imaging (DPCI), where the real and imaginary part of the complex refractive index as well as a small angle scattering signal is measured.

Edge detection is an often used task in image segmentation and image visualization. For instance one popular method for segmentation is the so-called region growing algorithm where a region is grown iteratively starting from a seed point until an edge is detected in the image. Another often used method is based on shape model. These models are adapted to the image where a cost function drives the surface of the model to locations with gradients in the image.

It has been found that it is sometimes difficult to extract structural information from these set of images. For instance, in spectral imaging, there is a step of spectral decomposition, where data are decomposed into contribution from different materials or physical effects, e.g. the photo-electric effect and Compton scattering. Decomposition is an ill-posed problem that leads to a strong noise amplification. Having such highly amplified noise impedes accurate segmentation of structures or organs in the material images. Similar problems have been found in DPCI.

SUMMARY OF THE INVENTION

There may therefore be a need for alternative method or system to extract structural information from images.

The object of the present invention is solved by the subject matter of the independent claims where further embodiments are incorporated in the dependent claims. It should be noted that the following described aspect of the invention equally apply to the image processing method, to the imaging arrangement, to the computer program element and to the computer readable medium.

According to a first aspect of the invention there is provided an image processing system comprising, comprising:

an input port for receiving two or more input images acquired of an object, wherein respective contrast in at least two of said images encodes information on different physical properties of the object, said images being converted from a signal detected at a detector of an imaging apparatus;

differentiator configured to form respective differences from pairs of image points from respective input images;

an edge evaluator configured to compute, based on said differences, an edge score for at least one of said pairs of image points, said score based on a measure that represents or is derivable from a likelihood function, said likelihood function based on a probability density that models noise for said signal; and an output port for outputting said score. In particular, the measure essentially equals (that is, up to a constant factor) said likelihood function or is a function of said likelihood function.

According to one embodiment, said edge score is a measure for the presence of an edge between the image points at least one of said image pairs.

According to one embodiment, the system comprises a segmenter (SEG) configured to execute a segmentation algorithm to segment at least one of the two or more input images, said segmentation execution being controlled or at least influenced by said score.

According to one embodiment, the segmentation algorithm is any one of: a region growing algorithm and/or a model based segmentation algorithm.

According to one embodiment, said noise likelihood function being formulatable in terms of at least one second order statistic for said noise.

According to one embodiment said likelihood function is a marginal likelihood function.

According to one embodiment the computing of said edge score includes inverting a covariance matrix that represents noise contribution in the information as per the at least two images.

A multitude of input image pairs are envisaged herein. For instance, according to one embodiment, the at least two input images are derived in a spectral and/or dual energy imaging procedure, wherein one of the at least two received images is a one from three types of images, i) a photoelectric image, ii) a Compton image or iii) a contrast agent image, or iv) a material-equivalent image, and wherein the at least one other received input image is a another one from among said four types of images.

Alternatively, in a DPCI setting the at least two input images are derived in a interferometric imaging procedure, wherein one of the at least two received input images is a one from three types of images, i) an attenuation image, ii) a phase contrast image or iii) a dark field image and wherein the at least one other received image is a another one from among said three types of images.

A combination of input images from both the spectral/dual CT setting and the DCPI setting is also envisaged herein. In other words, one of the input images is from the SCPI setting, the at least one other from the spectral/dual CT.

Applications in digital color photography are also envisaged wherein the at least input two images are derived in a color imaging procedure, wherein one of the at least two input received images is from one color channel and the at least one other input image other image is from at least one other color channel.

Again, the color photography setting may be combined with any of the above imaging settings.

The proposed system allows consistent and robust edge detection from these plurality of images, even when there is noise (anti-)/correlation across the image set. The proposed system exploits the (additional) information provided by the existence of the plurality of images in multi-contrast or multi-modal imaging.

The proposed method has been found useful in spectral and/or dual CT imaging and in DPCI imaging where noise correlation across the images have been observed. In particular, for spectral CT and dual energy CT, where there is a strong anti-correlation of noise at the same spatial location in the photo- and the Compton-image.

In DPCI, there is a moderate anti-correlation of noise in the attenuation contrast and the small angle scattering (dark field) contrast signal. Complexity of image feature extraction in from DPCI imagery is further compounded by the fact that there is also a strong spatial correlation of noise within the phase contrast image (which is equivalent to the well-known noise power spectrum that has peak at low frequencies).

Other applications such as in processing different color channel images in photography are also envisaged herein as are other multimodal or multi-contrast applications.

According to another aspect, there is provided a computer program element for controlling a system according to any one of the mentioned embodiments, which, when being executed by a processing unit, is adapted to perform the method steps of any one of mentioned embodiments of the method.

According to another aspect, there is provided a computer readable medium having stored thereon said program element.

BRIEF DESCRIPTION OF THE DRAWINGS

Exemplary embodiments of the invention will now be described with reference to the following drawings wherein.

DETAILED DESCRIPTION OF EMBODIMENTS

Figure 1:
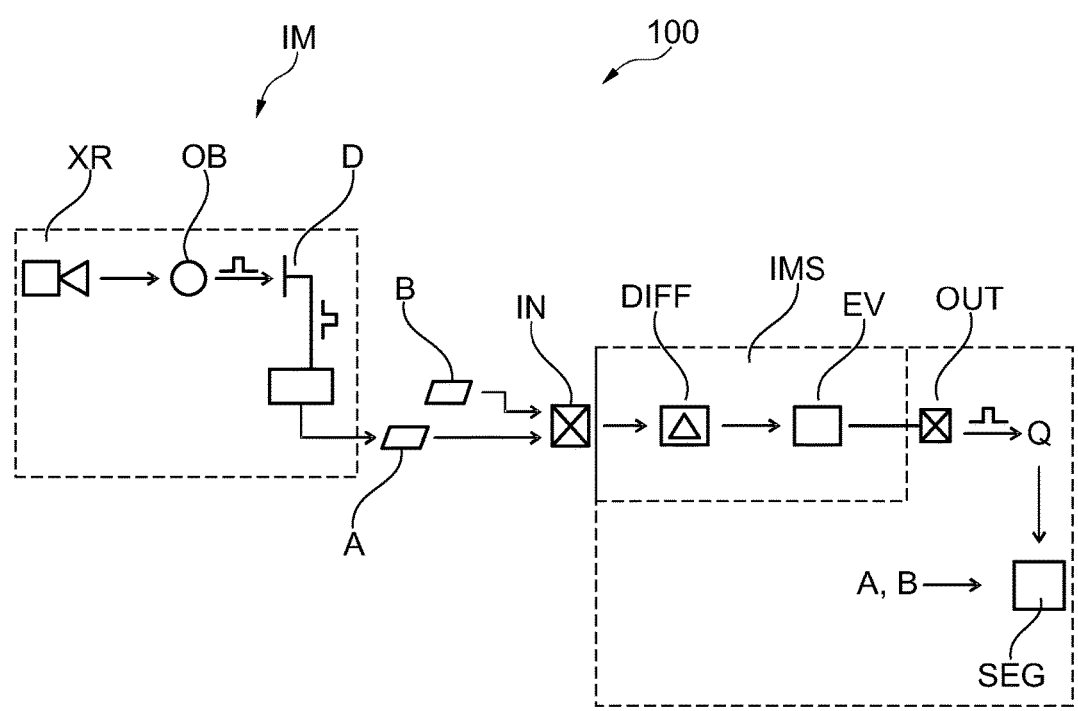
FIG. 1 shows a block diagram of an image processing arrangement.

With reference to FIG. 1 there is shown a block diagram of an image processing arrangement 100.

The arrangement 100 comprises one or more image modalities IM or imaging apparatuses and an image processing sub-system IPS.

The image processing sub system IPS may run as a software module on a workstation or general purpose computer communicatively connected in a wired or wireless network with the imager IM. This network allows the image processing system IPS to process in a manner to be described in more detail below two or more images A,B supplied by the one or more imaging apparatus IM. Of course such a network is not necessary in all embodiments as the images be otherwise supplied as input to the image processing system IPS, for instance by portable data carriers such as CDs or memory dongles etc.

A basic task as envisaged herein of the image processing sub-system IPS is edge detection in one or both of the two (or more) input images A,B.

Edge detection is a task often used in image segmentation, image visualization or in a host of other imaging tasks. Before elaborating further on image based edge detection, the providence and nature of the images A,B are briefly described. The images encode in digital form information about an object OB of interest. The nature of the image, that is, the information encoded by the contrast in these images, is a function of the type of imaging apparatus that was used for its acquisition.

Image apparatuses IM envisaged herein include dual or spectral CT imaging, differential phase contrast imaging DPCI (differential phase contrast imaging), and combined imaging modalities such as SPECT (Single-photon emission computed tomography)/PET (positron emission tomography) and MRI (magnetic resonance imaging) or CT and MRI, or indeed color photography.

A feature of these imaging modalities IM is that images A,B in different channels are provided. That is, not only one image is provided but a set of two (or more) images are supplied which represent the object in the same geometry, but contrast type in each of these images encode for a different physical property, a different physical effect.

For instance, in phase contrast imaging, one can derive even three images: the phase contrast image, the attenuation image and a dark-field image. The input image can then be chosen as any pair from these three, for instance A is the absorption image and B is the phase contrast image. Contrast type in the phase contrast image encodes for refraction. That is, the intensity of an image pixel represents how strongly the object at the respective locality refracts radiation. The attenuation image on the other hands represents attenuation and the dark field image represents small angle scattering. In dual CT imaging, a photoelectric absorption image and a Compton scattering image is provided. Spectral CT imaging allows performing material decomposition. Alternatively, material equivalent images are provided, each representing attenuation characteristics of a particular material type only, such as a contrast agent, or water, fat, etc. can be provided. Again, the input image pair A,B can be chosen as any combination from these images so long as the contrast type is different.

The image apparatus or modality IM can be broadly described as including a source XR that emits interrogating signals. For instance this can be an X-ray source with interrogation signal being x-ray radiation or may be an MRI apparatus where the interrogation signal is an electromagnetic pulse. This interrogating signal interacts with the object. The object then modulates onto the interrogating signal the desired contrast conferring information and a detection device D detects the, now modulated, interrogating signal after its interaction with the object. The detection device, in response to receiving said modulated interrogating signal, produces electric response signals which are then A/D-converted by a suitable DAS circuitry into digital image signals. The digital image signals can be processed by suitable signal processing into intensity values that form the input images. The intensity values are organized as individual image pixels arranged in rows and columns.

The signal processing to arrive at the intensity values includes, in CT, a reconstruction operation to reconstruct projection images detected at the (in this case X-ray) detector D into cross section images that can be combined into a 3-dimensional image Volume of the object. The so reconstructed cross section images (or the entire 3D volume) are then supplied as input images to the image processor system SPS. In dual or spectral CT, the signal processing further includes, in addition to the reconstruction, the material decomposition operation to arrive at the different contrast images (photoelectric, Compton, material equivalent image). There are embodiments where the material decomposition and the reconstruction are combined into one algorithm. In dual energy or spectral CT, the detector device may itself be of a multi-channel type such as multi-bin photon counting detector. Alternatively, imaging for the different channels may be achieved by single-channel energy integrating detector but the X-ray source XR is operated at different tube voltages to acquire the sets of different images at different contrast types.

In DPCI the interrogating signal not only interacts with object but also with an interferometer and the signal processing to produce the intensity values for the three images (absorption, phase contrast and dark-field) may include a phase retrieval operation as has been described elsewhere, for instance in Pfeiffer et al., *Phase retrieval and differential phase-contrast imaging with low-brilliance X-ray sources*, nature physics 2, 258 (2006).

The uses of other imaging modalities may necessitate other types of signal processing to convert detector image signals into image signals. But this is not to exclude others embodiments, where it is the A/D-converted detector signals themselves that are used as input images for present purposes.

In sum, the input images A,B may be generated by a single modality IM or by multiple different imaging modalities that may however be integrated into a single unit. The input images may derived from signals detected at a single detector and these signal are then split up, in different channels, by suitable signal processing (such as phase retrieval in DPCI) into the two or more input image. Alternatively, different detectors D may be used for each input image. The radiation supplied by the source XR for the image acquisition may be of the ionizing type (X-ray radiation) but non-ionizing radiation (in particular visible light) is also envisaged herein such as in color photography. In the color photography embodiment, one input image correspond to a color (RGB) image from one channel, the other input image corresponds to one other image channel. The input images A,B may be of any dimensionality (2D or 3D) but have preferably the same dimensionality. If the dimensionalities differ, one can form the intersection and apply the proposed method there.

Referring now back to the concept of edges, these are image structures that represent "transitions" such as transition from one physical property, or characteristic of the object to another or it represents a change in magnitude of the respective physical effect encoded by the image. If one considers the image as a 2D scalar field, an edge corresponds to the interface between two plateaus of different heights, where pixel values on either side of the edge have, in theory, markedly different values. One example from X-ray CT for instance is the transition from, say, soft tissue to a bone tissue. Bone tissue attenuates stronger than soft tissue and this fact is captured in the image with an edge indicating where bone transitions into soft tissue for instance. It should be noted that the term "edge" is used herein in a general sense. In particular, an edge may be constituted by a difference between a single given pair of image points in either of the input images. In particular herein an edge may have a "length" of one or just few pixels only in extreme cases.

Figure 2:
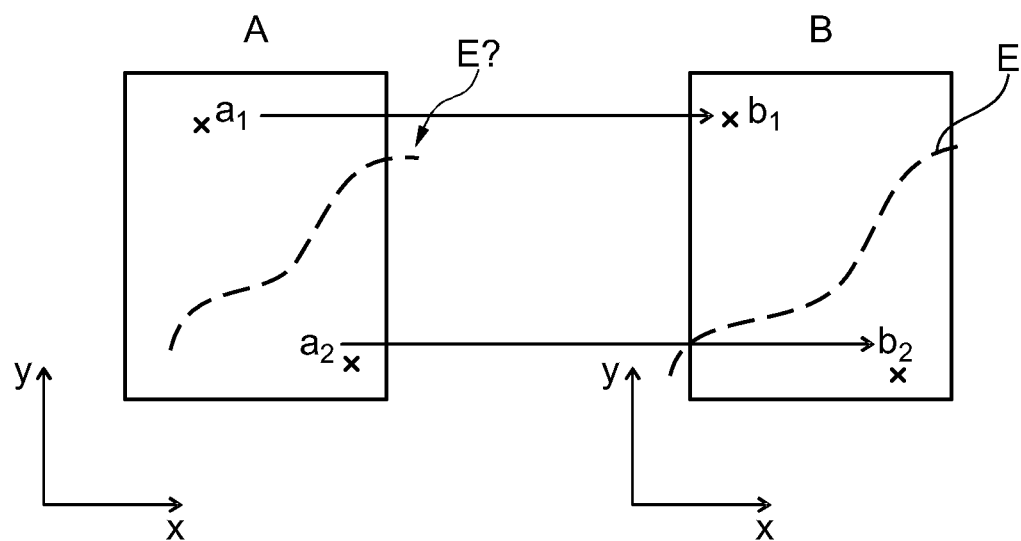
FIG. 2 shows an illustration of an edge detection task.

It is proposed herein a new image processing system SPS for edge detection that operates based on a statistically motivated framework as will be explained now with reference to FIG. 2. FIG. 2 shows schematically a pair of input images AB, with the understanding that the proposed system can also be applied to more than one pair of images.

One basic task of edge detection is to estimate a probability for two different pixels (in a given one of the two images) to represent the same physical property. For instance, one may ask for two different pixels to represent the same tissue class, ie, the likelihood that the underlying "true" pixel values are the same. This estimation may be based on the evaluation of four image samples, that is, two image pairs, each pair from a respective one of the two input images A,B. The samples are taken at the same respective locations in the two images, indicted in FIG. 2 by the arrows. The samples are denoted as $a_1$, $a_2$, $b_1$, $b_2$, with $a_1$, $a_2$ being the pair from image A and $b_1$, $b_2$, being other pair drawn from image B. The pair can be written as a vector $(a_1, a_2, b_1, b_2)$, each $a_i$ (i=1,2) and b (j=1,2) denoting the respective pixel values (intensity) at different image locations in the respective images. In other words, the image pair from image A and the pair from image B are spatially corresponding image samples. The two pairs correspond space-wise because the respective row and column co-ordinate (x,y) are the same which can be expressed in terms of the projection operator $\Pi^x$, $\Pi^y$ (that projects onto the respective image pixel coordinate axis X,Y) as:

$$\Pi^X(a_1)=\Pi^X(b_1), \Pi^Y(a_1)=\Pi^Y(b_1),$$

$$\Pi^X(a_2)=\Pi^X(b_2), \Pi^Y(a_2)=\Pi^Y(b_2), \quad (1)$$

Unfortunately, the intensity values in the image samples do not exactly correspond to the true image value which one would have obtained had it not been for noise. Noise is prevalent for instance in the electronics of the detection device D for instance or is introduced by the A/D conversion or by the signal processing stage. In other words, the image signals in $a_i$ and $b_j$ (i,j=1,2) from the two images can be thought of as a combination from a true underlying signal s and a noise contribution n.

Assuming now, as prior knowledge, that there is no edge running between the respective image pairs, the true signal component s in $a_1$ and $a_2$ is the same and so is the true signal component s' in $b_1$ and $b_2$. In other words, we can encode this prior assumption or condition as:

$$a_1 = s+n_1, a_2 = s+n_2$$

$$b_1 = s'+n_3, b_2 = s'+n_4 \quad (2)$$

with $(n_1, n_2, n_3, n_4)$ being a certain noise contribution realization. Assuming now the noise contribution is governed by a certain joint probability density function for the noise $p(n_1, n_2, n_3, n_4)$, we can then separate the noise realizations $(n_1, n_2, n_3, n_4)$ to then formulate a likelihood function. Separating noise from the true signals s,s', given our assumptions as per equation (2) above can be achieved by forming differences $\Delta_a$, $\Delta_b$ or (approximate) gradients for each of the image pair samples $a_1$, $a_2$ and $b_1$ and $b_2$, respectively. In other words we form:

$$\Delta_a = a_1 - a_2 = (s+n_1)-(s+n_2) = n_1 - n_2 => n_2 = n_1 - \Delta_a$$

$$\Delta_b = b_1 - b_2 = (s'+n_3)-(s'+n_4) = n_3 - n_4 => n_4 = n_3 - \Delta_b \quad (3)$$

If we now include the right hand sides from equations (3) into the joint probability function for the noise, we can eliminate at least two noise variables by marginalizing out the same and form the marginal noise likelihood as per the following expression:

$$p(\Delta_a, \Delta_b \mid a_1 = a_2, b_1 = b_2) \propto \quad (4)$$

$$\int\int_{-\infty}^{\infty} p(n_1, n_1 - \Delta_a, n_3, n_3 - \Delta_b) dn_1 dn_3$$

This marginal likelihood function (right hand expression in (4)) is obtained by marginalizing out one component from each image sample pair (in this case denoted as $n_1, n_3$) from the joint probability distribution $p(n_1, n_2, n_3, n_4)$. The marginal likelihood function is proportional to the conditional likelihood function (left hand side of (4)). The conditional likelihood function is conditioned on the assumption for there not to be an edge between the observed given data $a_i$ and $b_j$ (i,j=1,2). That is, the conditional likelihood function "explains" the observed gradient values $\Delta_a$, $\Delta_b$ given the assumption that there is no edge between the two considered input image pixel pairs.

Ordinarily, given only the sample ($a_1$, $a_2$, $b_1$, $b_2$) there is no way to distinguish between the noise and the signal content in the measurement. But, as discovered by Applicant, the situation becomes more tractable if we formulate the following question: How likely is it to observe the actual measurement ($a_1$, $a_2$, $b_1$, $b_2$) under the assumption $a_1=a_2$ and $b_1=b_2$? This question can be answered more easily for a given statistical assumption. This is because we can then eliminate the signal content in the measurements by calculating the differences $\Delta_a = a_1 - a_2$, $\Delta_b = b_1 - b_2$ and then integrating (that is, marginalizing) in the joint probability density (as per said statistical assumption) over all noise combinations ($n_1$, $n_3$) in ($n_1$, $n_2$, $n_3$, $n_4$) which yield these differences.

It is now proposed then to then use the resulting marginal likelihood as per equation (4) as a confidence measure, denoted as Q herein, for the existence of a true edge or, more specifically, for the existence or a true difference between image values at different locations in the images given the observed gradients $\Delta_a$, $\Delta_b$. The higher the value of the marginal likelihood, the more confidence one has that there is no edge present between the image values of each pair.

According to one embodiment, the marginal likelihood function itself is taken as the confidence measure. In another embodiment, the negative logarithm of the marginal likelihood is taken. However, any monotonically decreasing function of the likelihood may be used instead.

The above formulation (4) is very general and can be simplified by making further assumptions on the underlying statistics for the noise. For instance, second order statistics of the samples can be used to describe the noise in these measurements. For instance, assuming that noise is Gaussian multi-variate, second order statistics can be used with particular benefit to further describe the noise in the observed measurements by means of the covariance matrix C. For the Gaussian multi-variate case, the covariance matrix C can be written as:—

$$C = \begin{pmatrix} c_{11} & c_{12} & c_{13} & c_{14} \\ c_{12} & c_{22} & c_{23} & c_{24} \\ c_{13} & c_{23} & c_{33} & c_{34} \\ c_{14} & c_{24} & c_{34} & c_{44} \end{pmatrix} \quad (5)$$

where rows and columns are indexed by the sample vector $a_1$, $a_2$, $b_1$, $b_2$, respectively As a consequence of the mentioned indexing in the covariance matrix C, the diagonal elements describe the noise variances of the samples and the off-diagonal elements the correlation of noise within the images ($c_{12}$, $c_{34}$) or between the images ($c_{13}$, $c_{14}$, $c_{23}$, $c_{24}$). The matrix C is symmetric and positive definite. The calculation of the full covariance matrix is known in the art, in particular if linear methods like filter-back-projection (FBP) are used for image reconstruction in CT for instance. In CT, noise from projection domain can be error-propagated into the image domain to set up matrix C as per (5). Error propagation in this connection is described, for instance in Wunderlich and Noo, "Image covariance and lesion detectability in direct fan-beam X-ray computed tomography", Physics in Medicine and Biology 53 (2008). See for instance p 2479, Eqs (32)-(37). With this covariance matrix, we can re-formulate the likelihood (4) of obtaining the noise realizations ($n_1$, $n_2$, $n_3$, $n_4$) in the measured vector ($a_1$, $a_2$, $b_1$, $b_2$) as:

$$p(n_1, n_2, n_3, n_4) \propto \exp(-\frac{1}{2}(n_1, n_2, n_3, n_4)C^{-1}(n_1, n_2, n_3, n_4)^T) \quad (6)$$

Relation (6) allows reformulating the desired marginal likelihood in (4) as:

$$p(\Delta_a, \Delta_b \mid a_1 = a_2, b_1 = b_2) \propto \quad (7)$$

$$\int\int_{-\infty}^{\infty} \exp\left(-\frac{1}{2}(n_1, n_1 - \Delta_a, n_3, n_3 - \Delta_b) S(n_1, n_1 - \Delta_a, n_3, n_3 - \Delta_b)^T\right) dn_1 dn_3$$

with $S=C^{-1}$ the inverse of the covariance matrix.

In the following a few considerations will be given as to how Q can be further simplified in the light of further assumptions on the underlying noise model. For the most general covariance matrix, the explicit calculation of the double integral in (7) may be computationally costly. However, once the covariance matrix C is known numerically, it is a computationally relatively cheap to calculate the inverse matrix S and the likelihood for the actual measurements as per (4) or, more specifically, (7).

Let us consider two cases that lead to further simplifications, with both cases envisaged in embodiments: First, if the noise of the four samples in uncorrelated, then both the covariance matrix and its inverse are diagonal and the desired likelihood is just a product of Gaussian functions.

According to another embodiment, the covariance matrix (5) has the special form:

$$C = \begin{pmatrix} c_{11} & c_{12} & c_{13} & c_{14} \\ c_{12} & c_{11} & c_{14} & c_{13} \\ c_{13} & c_{14} & c_{33} & c_{34} \\ c_{14} & c_{13} & c_{34} & c_{33} \end{pmatrix} \quad (8)$$

Geometrically, this covariance matrix models the case where the image variances at the two image locations are the same (i.e., $c_{11}=c_{22}$, $c_{33}=c_{44}$) and that the covariance between the images is symmetric with respect to the two image locations ($c_{13}=c_{24}$, $c_{14}=c_{23}$). In typical CT situations, these relations are fulfilled approximately since the variances in reconstructed CT images vary only slowly in space. This increased symmetry is also reflected in the inverse matrix S, which can therefore be written as $$S = \begin{pmatrix} s_{11} & s_{12} & s_{13} & s_{14} \\ s_{12} & s_{11} & s_{14} & s_{13} \\ s_{13} & s_{14} & s_{33} & s_{34} \\ s_{14} & s_{13} & s_{34} & s_{33} \end{pmatrix} \quad (9)$$

Under this assumption, the desired likelihood for measuring the observed differences $\Delta_a = a_1 - a_2$, $\Delta_b = b_1 - b_2$ in the two images is:

$$p(\Delta_a, \Delta_b | a_1 = a_2, b_1 = b_2) \propto \quad (10)$$
$$F \exp\left(-\frac{1}{4}(\Delta_a^2(s_{12} - s_{11}) + 2\Delta_a\Delta_b(s_{14} - s_{13}) + \Delta_b^2(s_{34} - s_{33}))\right)$$

with $$F = \frac{\sqrt{\pi(s_{11} + s_{12})}}{\sqrt{(s_{11} + s_{12})(s_{33} + s_{34}) - (s_{13} + s_{14})^2}}, \quad (11)$$

The formulation (10) is thus a further simplification of the likelihood function (4) or (7).

It should be clear that the above approach can be applied for any probability density which is thought to govern the noise contribution in the measurements. This may differ from image modality to image modality used for the image acquisition. However, some models may be less numerically tractable than others. The multi-variate Gaussian noise model as used above has proved to be sufficient and yield good results in most measurement scenarios, in particular in CT. Poisson models for p may be also used instead and are envisaged in other embodiments. Other examples envisaged herein for suitable models are Rician distributions which feature in amplitude images in MRI imagery. See for instance S. O. Rice "Mathematical Analysis of Random Noise", Bell System Technical Journal, 23: 3. July 1944 pp 282-332 or Bell System Technical Journal, 24: 1945 pp 46-156.

The confidence measure Q based on equation (4) or, in particular, the various simplifying embodiments as introduced above at eqs (4)-(11) can be used for various image processing tasks, for instance segmentation or visualization as mentioned earlier.

Referring now briefly back to FIG. 1, operation of the proposed imaging system IPS is now as follows. The two or more input images A,B are received at input port IN of image processing system IPS. A respective image pair $(a_1, a_2)$ is identified in one of the images. Because of an assumption that the underlying geometry is the same, the specification as one image pair is sufficient to defined the other image pair $(b_1, b_2)$ having the same co-ordinates in the other image. The difference operator DIFF is then applied to form differences from the respective pairs to arrive at gradient estimates. The gradient estimates are then input into an evaluator EV to compute an edge score for the two different pairs. The edge score represents the likelihood for the presence of an edge in the respective input image between the image points of the respective pair. The score Q is based as explained above on a marginal likelihood function that is derived from the assumption or prior information that there is no edge for given pairs of image points. A characteristic of the above considered marginalized likelihood function for the noise is that two or more noise contributions have been marginalized out from a common joint probability density for the noise contribution in the two image measurements. According to one embodiment this score is based on an expression as per equation (4) above. The edge score Q is then output at the output port and may then be made available for other imaging tasks, for instance, segmentation by a segmenter SEG.

For given image processing task, the score Q may be used in a binary fashion by comparing the score value against a defined threshold value to decide for any given pair whether or not there is an edge present in between image pixels forming said pair. In other embodiments the score function is used implicitly as a penalizer term in an objective function to drive an optimization problem in terms of which the given image processing task is formulated.

For instance, in one embodiment, the segmenter SEG implements a region growing algorithm. A seed point is picked first and for some or all neighboring pixels, it has to be decided whether they belong to the same tissue class. In this application, $a_1$ and $b_1$ are fixed to the image values of the seed point, and the neighboring points are used subsequently for $a_2$ and $b_2$. All neighboring points with a confidence Q smaller than a threshold are considered to belong to the same tissue class. For all these points, the process is repeated in the next iteration of the region growing: again, all neighboring points are considered and the confidence Q is evaluated (where $a_1$ and $b_1$ are still the pixel values of the seed point).

In other embodiments, the measure Q is used in a segmentation algorithm formulated as an optimization problem which can be formulated by means of an objective or cost function. More specifically, it proposed herein in one embodiment to include the measure Q as a regularizer or penalizer term into an objective function to drive the segmentation algorithm. Yet more specifically, the segmentation is implemented by a model-based segmentation. In model based segmentation, a conceptual shape model is used for instance a mesh structure. In model based segmentation, the cost function is set up that includes a term that represents a deformation of said model to fit a given image region. This deformation can be expressed as surfaces of a model being attracted towards high gradients in the image. Using the statistical framework proposed in this invention, the attractive force is calculated by the statistically motivated confidence measure Q which is included as a penalizer or regularizer term in the objective function.

Figure 3:
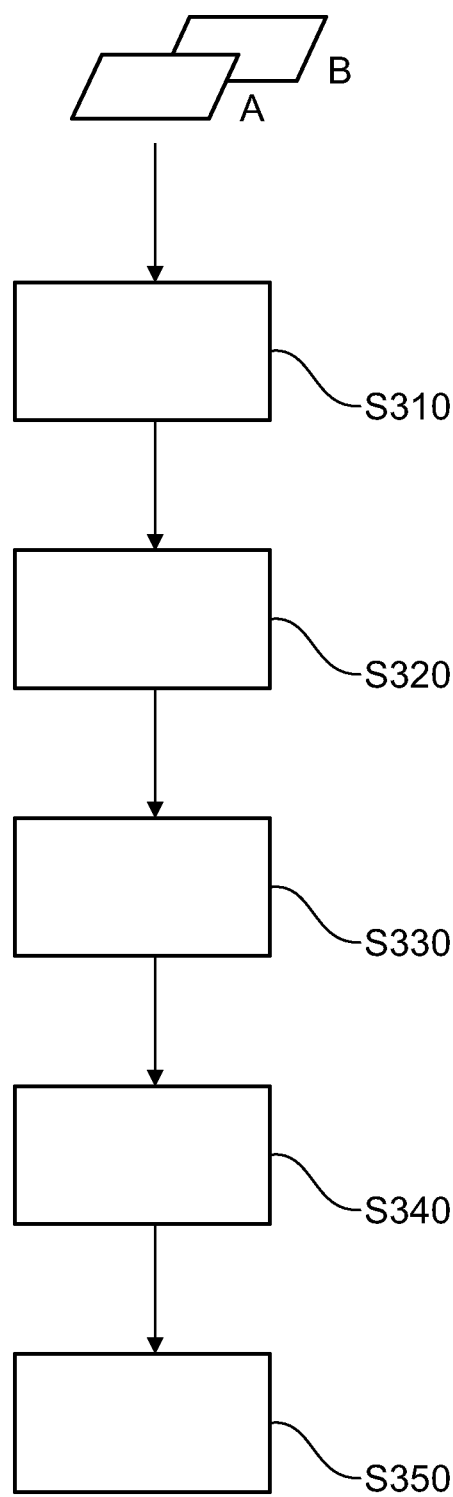
FIG. 3 shows a flow chart for a method of image processing.

Reference is now made to FIG. 3 where the image processing method underlying the operation of the image processor IPS above is summarized. However, it should be noted that the following flow chart may also be read in its own right and it is not necessarily tied to the architecture as per FIG. 1.

At step S310 two or more images are received, not necessarily at the same time. At least two of these images (referred to herein as A, B) are derived from multi-modal or at least multi contrast imaging modalities. In other words, each image A,B represents the same object at different contrasts. The contrast represents different physical effects or magnitudes of said physical effects, etc.

At step S320 in each of the two images A,B, a respective gradient or difference is formed from a given pair of image points in the two images A,B, respectively. The pairs are selected manually be a user or the pairs are specified automatically. An example of the later is, if the proposed method is used in a context of iterative image processing such as the above described in region growing or model based segmentation. In these or similar applications, a loop may be implemented which loops automatically through different image point pairs.

The two images as received at step S310 are assumed to represent the same object in the same geometry. However, the same geometry requirement may not be necessary in all embodiments as spatial registration may be applied to the two images to achieve this. In other words, some embodiments may include a spatial registration to ensure that spatially corresponding image pair can be selected before the gradients are formed.

At step S330, an edge score is computed based on the two gradients. The said score is associated with each of the image pairs, or at least with one of them, and represents the confidence or measure for there to be an image edge in-between the points of the respective pair. The score is a function based on a marginal likelihood function derived from an underlying joint probability density that models the noise of the measurement process involved in the image acquisition. The marginal likelihood function is as per eq (4) and the variants thereof discussed above. Mathematical or equivalents or numerical approximations of (4) and/or extensions of (4) to more than two image pairs are specifically included herein.

At step S340 the score for the two pairs of image points is then made available for further image processing.

For instance, in an optional step S350, the score is used in an image segmentation task. As discussed above, the score value may be used for binary decisions but may also be used implicitly as a regularizer term in an objective function, for instance to drive a segmentation algorithm. In this manner, the computed score is used in step S350 to control an execution of an segmentation algorithm or is at least used to influence the course of the execution of such as segmentation algorithm when the score is used a regularizer term in the objective function.

When the score is used in a region growing segmentation algorithm as described above, it has been found that the score allows taking into account changes in the spatial correlation of noise in this application that can occur for instance if a low-pass filter was applied during reconstruction. This allows for instance to take into account even low-frequency noise as in DPCI imagery.

Figure 4:
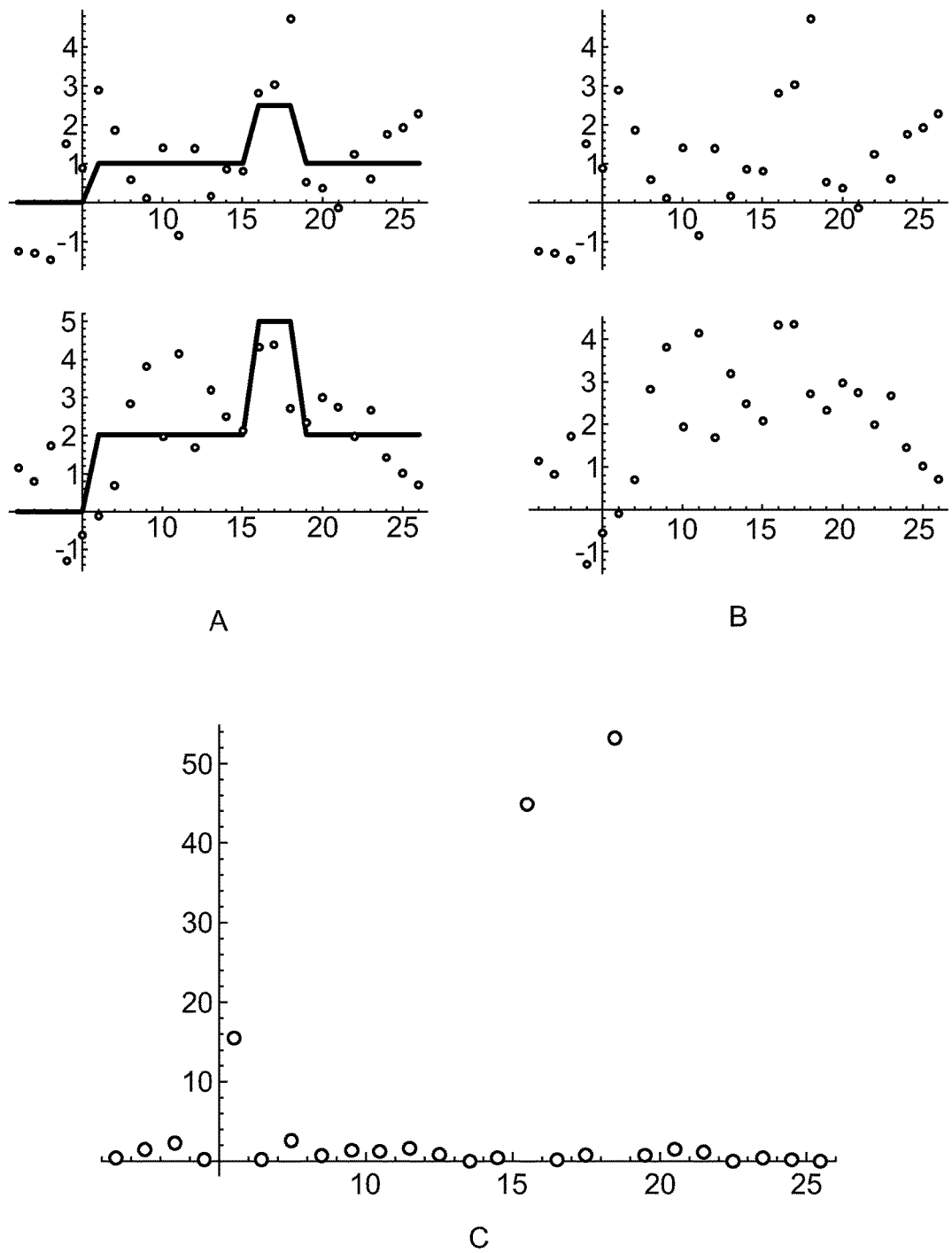
FIG. 4 shows further illustrations of an edge detection task based on exemplary data.

Reference is now made to FIG. 4 to demonstrate the effectiveness of the proposed image processing method and system for edge detection. For ease of representation a one-dimensional example is presented but the proposed method yields similar results in 2D or 3D cases. The solid lines on the left (A) in the two diagrams show a "true edge signal" and the points are noise realizations of samples assuming a noise variance of 1 and a correlation of −0.95. The diagrams to the right at B show the noise realization in isolation, to illustrate that the high contrast feature as per the solid line in (A) is not ascertainable by mere visual inspection. Diagram C show the negative log-likelihood of the marginal probability for the gradients of the samples of FIG. 1 that clearly identifies the jumps at the underlying signals correctly.

Is will be understood by those skilled in the art that the proposed method can be readily extended to more than two image pairs and/or indeed to not only pairs but any ordered or un-ordered n-tuple (n>2) of image points. In particular, if the edge is more than one pixel long (and this will be the usual case), the proposed confidence measure will be computed for a plurality of pixel pairs to establish the course of the edge in the image.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium (in particular bot necessarily a non-transitory medium), such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An image processing system, comprising:
   an input port for receiving at least two images acquired of an object, wherein respective contrast in said images encodes information on different physical properties of the object, said images being converted from a signal detected at a detector of an imaging apparatus;
   a differentiator configured to form differences from pairs of image points from the respective input images;
   an edge evaluator configured to compute, based on said differences, an edge score for at least one of said pairs of image points, wherein said edge score represents a likelihood of an edge between the image points in the respective images, and wherein the edge score is based on a likelihood function and a joint probability density that models noise for said signal; and
   an output port for outputting said edge score.

2. The system of claim 1, further comprising a segmenter configured to execute a segmentation algorithm to segment at least one of the two or more input images based on said edge score.

3. The system of claim 2, wherein the segmentation algorithm is at least one of a region growing algorithm and a model based segmentation algorithm.

4. The system of any claim 1, wherein said likelihood function is formulated in terms of at least one second order statistic for said noise.

5. The system of any claim 1, wherein said likelihood function is a marginal likelihood function.

6. The system of claim 1, wherein computing said edge score includes inverting a covariance matrix that represents noise contribution in the information as per the at least two images.

7. The system of claim 1, wherein the at least two input images are derived in at least one of a spectral imaging procedure and dual energy imaging procedure, wherein a first image of the at least two input images is one of a photoelectric image, a Compton image, a contrast agent image, and a material-equivalent image, and wherein a second image of the at least two input images is different from the first image.

8. The system of claim 1, wherein the at least two input images are derived in an interferometric imaging procedure, wherein a first image of the at least two input images is at least one of an attenuation image, a phase contrast image, and a dark field image, and wherein a second image of the at least two input images is different from the first image.

9. The system of claim 1, wherein the at least input two images are derived in a color imaging procedure, wherein one of the at least two input images is from one color channel and the at least one other input image is from at least one other color channel.

10. An image processing method for edge detection, comprising:
    receiving at least two images acquired of an object, wherein respective contrast in said images encodes information on different physical properties of the object, said images being converted from a signal detected at a detector of an imaging apparatus;
    forming differences from pairs of image points from the respective images;
    based on said differences, computing an edge score for at least one of said pairs of image points, wherein said edge score represents a likelihood of an edge between the image points in the respective images, and wherein the edge score is score based on a likelihood function and a probability density that models noise for said signal; and
    outputting said edge score.

11. The method of claim 10, further comprising segmenting at least one of the two images based on said edge score.

12. An imaging arrangement, comprising:
    an image processing system, comprising:
       an input port for receiving at least two images acquired of an object, wherein respective contrast in said images encodes information on different physical properties of the object, said images being converted from a signal detected at a detector of an imaging apparatus;
       a differentiator configured to form differences from pairs of image points from the respective input images;
       an edge evaluator configured to compute, based on said differences, an edge score for at least one of said pairs of image points, wherein said edge score represents a likelihood of an edge in the respective input images between the image points, and wherein the edge score is based on a likelihood function and a joint probability density that models noise for said signal; and
       an output port for outputting said edge score; and
    at least one imaging apparatus supplying the at least two images.

13. A non-transitory computer-readable medium having one or more executable instructions stored thereon, which, when executed by at least one processor, cause the at least one processor to perform an image processing method for edge detection, the method comprising:
    receiving at least two images acquired of an object, wherein respective contrast in said images encodes information on different physical properties of the object, said images being converted from a signal detected at a detector of an imaging apparatus;
    forming differences from pairs of image points from the respective images;
    based on said differences, computing an edge score for at least one of said pairs of image points, wherein said edge score represents a likelihood of an edge in the respective input images between the image points, and wherein the edge score is score based on a likelihood function and a probability density that models noise for said signal; and
    outputting said edge score.

* * * * *